United States Patent [19]

Yamada

[11] Patent Number: 4,509,046
[45] Date of Patent: Apr. 2, 1985

[54] INDICATING METHOD AND APPARATUS FOR DIGITIZER MENU PORTIONS

[75] Inventor: Mitsuhiko Yamada, Kyoto, Japan

[73] Assignee: Dainippon Screen Mfg. Co., Ltd., Kyoto, Japan

[21] Appl. No.: 394,652

[22] Filed: Jul. 2, 1982

[30] Foreign Application Priority Data

Jul. 30, 1981 [JP] Japan .................. 56-120403

[51] Int. Cl.$^3$ .................................... G09G 3/00
[52] U.S. Cl. ..................... 340/815.1; 340/815.02; 340/815.12; 340/365 VL; 364/188
[58] Field of Search ............... 340/703, 811, 815.02, 340/815.03, 815.1, 815.12, 815.14, 365 R, 365 VL, 711, 712; 364/188

[56] References Cited

U.S. PATENT DOCUMENTS

| | | |
|---|---|---|
| 3,129,421 | 4/1964 | Freedman . |
| 3,268,889 | 8/1966 | Ast .................................... 340/815.1 |
| 4,202,038 | 5/1980 | Petersson .................... 340/365 VL |
| 4,310,839 | 1/1982 | Schwerdt ............................ 340/712 |
| 4,333,097 | 6/1982 | Buric et al. .................. 340/365 VL |
| 4,374,381 | 2/1983 | Ng et al. ............................. 340/712 |

FOREIGN PATENT DOCUMENTS

| | | |
|---|---|---|
| 1805726 | 12/1976 | Fed. Rep. of Germany . |
| 1479584 | 7/1977 | United Kingdom . |
| 1526091 | 9/1978 | United Kingdom . |

Primary Examiner—Gerald L. Brigance
Attorney, Agent, or Firm—Brumbaugh, Graves, Donohue & Raymond

[57] ABSTRACT

The proposed method comprises a step of indicating the menu portions which must be operated in any processing step in computer processing, wherein the indication is desirably performed by means of light sources of different colors some of which are selected alternatively and sequentially so as to be switched on in each different step. The proposed apparatus is constructed such that it might be suited for and utilized in the proposed method in that it comprises plural cells each provided on the back sides of said menu portions thereby plural light sources of different colors being disposed in each cell. Each of said lighting sources may alternatively be disposed on the front of the digitizer and near each menu portion.

2 Claims, 5 Drawing Figures

DIGITIZER (REAR VIEW)

INDICATING METHOD AND APPARATUS FOR DIGITIZER MENU PORTIONS

BACKGROUND OF THE INVENTION

The present invention relates to a method and an apparatus for directly indicating various times of information on a digitizing table (when small-scaled, it may be called "tablet"; however, inclusively called hereinafter "digitizer") which items of information are concerned with a plurality of menu portions provided on said digitizer. The menu portions respectively correspond to data and commands that are previously prepared for use, and will be selected by means of a cursor or a stylus pen so that they might be input into a data processing device such as a computer in a desired sequence. The abovementioned information will give guidance for the sequential order in processing the menu portions as well as guidance for recognition of said portions in respect of their correspondence with the functions of selected commands.

In general, all previously prepared data or commands are not necessarily used in all of the various steps of computer processes. In other words, only some of said data or commands are necessary for each of the process steps. Further, are a variety of functions are respectively allotted to the menu portions so that the operational procedures for input into the computer are very annoying and complicated.

This will be explained more in detail hereinafter. It is assumed here for example that the steps of Input 52, Process-1 53, Process-2 54 and Process-3 55 should be performed in a sequence as shown in FIG. 1 and that the commands shown in the left column of Table 1 should provide inputs corresponding to said steps.

A digitizer 1 (FIG. 2) is provided with a plurality of menu portions "A", "B", ..., "V" and OP. END 58 as shown in FIG. 2, these portions being related to the commands "a", "b", ..., "v" and Operation end 56, respectively. It is to be noted here that each group of the commands in the left column of Table 1 is charged into the computer by means of each corresponding group of the menu portions shown in the right column of said table.

For instance, the commands "a", "b", "c", "d", "e" and Operation end 56 are necessary in the Input 52 step and are charged by means of the menu portions "A", "B", "C", "D", "E", and OP. END 58. The other steps, i.e. Process-1 53 to Process-3 55 are performed in similar manners.

TABLE 1

| Processing Steps | Necessary Commands | Exemplified Functions | Menu Portions |
|---|---|---|---|
| Input (52) | a, b, c, d, e Operation end (56) | | A, B, C, D, E OP. END (58) |
| Process-1 (53) | f, g, h, p, q, t, u, v | correction stoppage interruption return to Input (52) | F, G, H, P, Q, T, U, V, |
| | Operation end (56) | | OP. END (58) |
| Process-2 (54) | i, j, k, l, p, q, | correction | I, J, K, L, P, Q, |

TABLE 1-continued

| Processing Steps | Necessary Commands | Exemplified Functions | Menu Portions |
|---|---|---|---|
| | r, s, t, u, v | correction stoppage interruption return to Input (52) | R, S, T, U, V, |
| | Operation end (56) | | OP. END (58) |
| Process-3 (55) | m, n, o, r, s, t, u, v | correction stoppage interruption return to Input (52) | M, N, O, R, S, T, U, V, |
| | Operation end (56) | | OP. END (58) |

As described above, when a series of computer process steps is carried out, it is a rare event that all the menu portions on the digitizer are operated to provide the desired commands. Namely, it is usual to initiate the commands by means of only a few menu portions in most of the processing steps.

The functions of the commands corresponding to the menu portions are, as shown in the middle column of Table 1, different from each other. They are, for example, "correction", "stoppage" and so on in accordance with their own processing objectives.

Accordingly, an operator must have a correct knowledge of the usages and functions as to each menu portion in order to properly select these portions in series for the input operations in each of the processing steps so that, as described above, a sequential electronic data processing operation comprising several steps is accomplished by selecting the required menu portions with use of a stylus pen or cursor to input appropriate data and commands.

As will be now appreciated, the above operations are so complicated that even a skilled operator may make mistakes.

BRIEF SUMMARY OF THE INVENTION

The invention aims to solve the above problem. Therefore, it is an object of the invention to provide a method and an apparatus by which the menu portions to be selected as inputs, the order of operation thereof and the command functions corresponding thereto are indicated for each processing step on or near the menu portions of digitizer.

Other objects and advantages of the invention will be also appreciated from the following description of a preferred embodiment illustrated in the accompanying drawings.

DETAILED DESCRIPTION OF THE INVENTION

Figure 3:
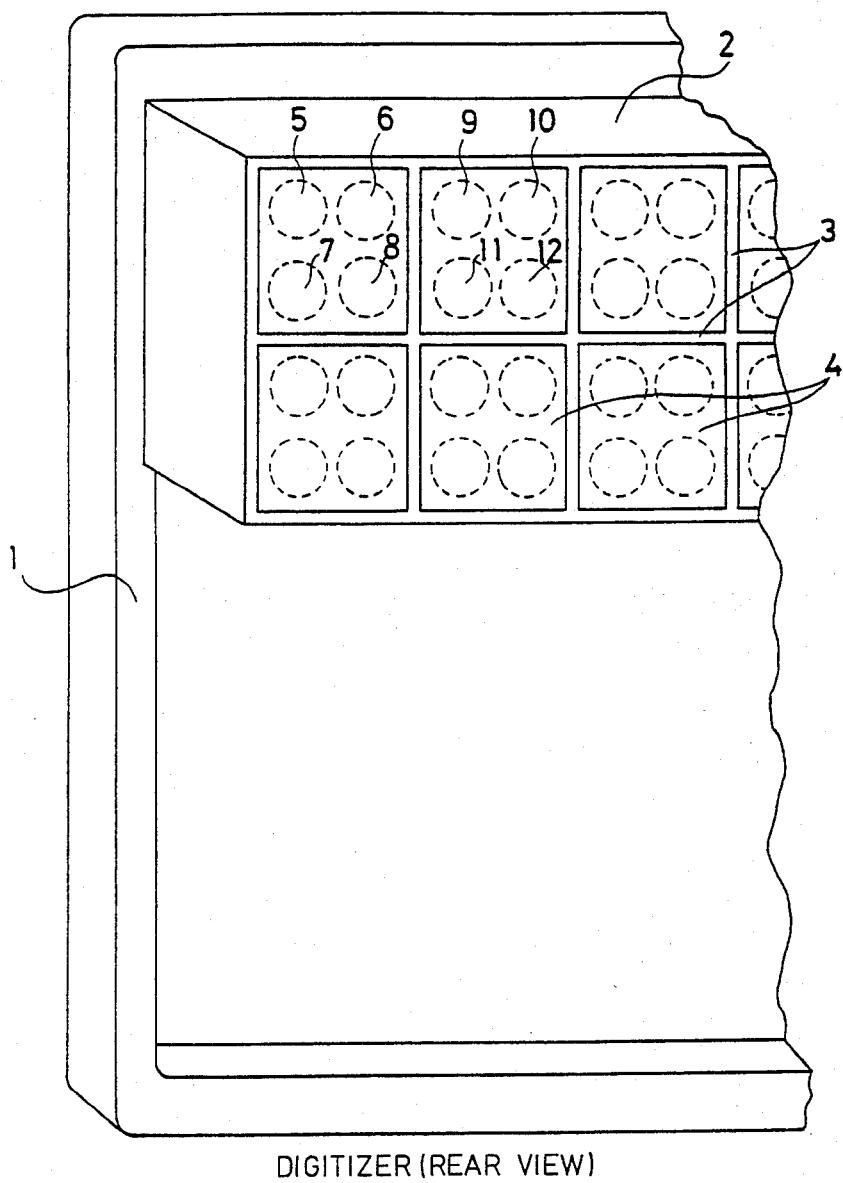
FIG. 3 is a perspective view of an embodiment of the invention, seen from behind to illustrate the principal parts.

The invention will be described hereinafter in detail and with reference to the drawings, among which FIG. 3 is a perspective view of the back side of the principal parts of the apparatus of the invention.

Figure 1:
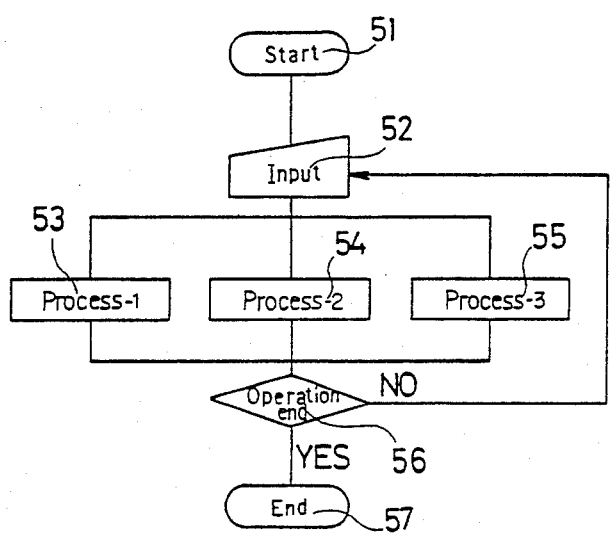
FIG. 1 is a flow chart showing an example of data processing by a computer.
Figure 2:
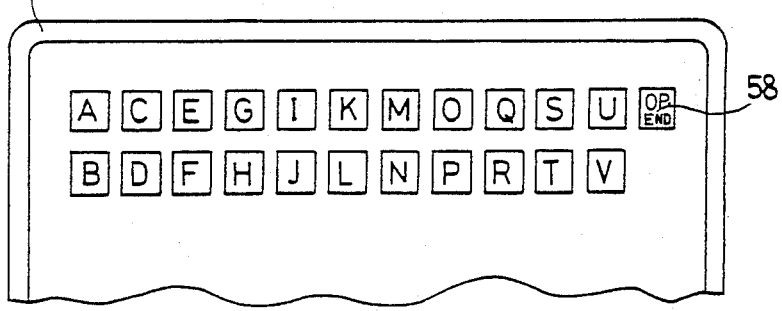
FIG. 2 is a plan view which diagrammatically shows a part of digitizer having menu portions.

The illustrated apparatus comprises a light box formed with a shading frame 2 and a back plate 4, the light box being disposed at the back side of a transparent digitizer 1 that has menu portions composed of a transparent material. Said light box is divided by partitions 3 into a number of cells in accordance with menu portions such as those shown in FIG. 2, that is to say, "A", "B", "C", "D", ..., "V" and OP. END 58 of the digitizer 1. Each cell is tightly sealed so as not to be disturbed by any light beam which might otherwise come from other cells through chinks. Further, each of said cells has several light sources accommodated therein and having different colors. The light sources in each cell are controlled in such a manner as to be switched on and off independently of each other.

For instance in FIG. 3, the light sources 5, 9, ... emit a white light and the light sources 6, 10, ... emit a red light whilst the sources 7, 11, ... emit a yellow light and the sources 8, 12, ... emit a green light.

Any kind of the light emission means, such as electric bulbs or light emitting diodes (LED), can be used as the light sources 5, 6, 7, ..., 12.

Figure 4:
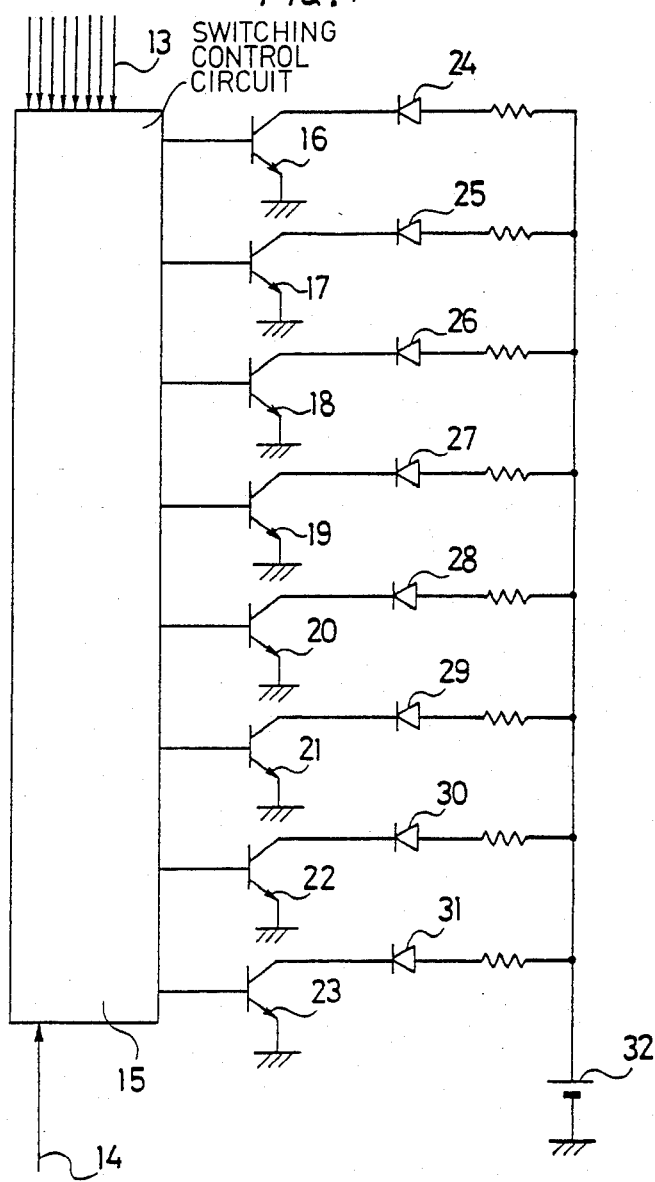
FIG. 4 is an exemplified circuit for control of switching on and off the light sources in said embodiment.

Switching control of these light sources may be done by means of a switching control circuit 15 as shown in FIG. 4, for example. The reference numeral 32 indicates an electric power source.

Selection signals 13 from a data bus of the computer determine the light sources which must be switched on at each stage. The timing for said switching on of the selected light sources is, on the other hand, determined by an output latch pulse signal 14. For instance, when a selection signal of the eight bigs 00001001 is given to the control circuit 15 from the data bus, the base voltages for the first and the fourth transistors 16, 19 are increased. Accordingly, the light emitting diodes 24, 27 are switched on to illuminate the menu portions which are then to be operated. The operation of said digitizer is thus made so simple that any possible mistake in operation is easily avoided securely. The reference numerals 17, 18 and 20 to 23 also indicate transistors, and the other numerals 25, 26 and 28 to 31 indicate the other light emitting diodes, respectively.

If more light sources than those illustrated in the example are required, the switching control circuit 15 may be scaled up or other similar circuits may be added. It is also possible, on the other hand, to connect each of the different colored light sources in each menu portion to receive the command signals for the different functions to thereby switch on the light source having a predetermined color in accordance with the function that is to be selected. The operation will thus be made much easier by such arrangement.

An example of the abovementioned arrangement is given in Table 2. The relations between the color of the light sources and the functions of commands in each menu portion are such that the commands for correction are represented by the red light R, the commands for stoppage, interrruption and return to input are represented by the yellow light Y whereas the command for operation end is represented by the green light G, the other commands being represented by the white light W. In Table 2, the numeral suffixes indicate the order of lighting, i.e., the light source having lower numeral is switched on earlier.

Accordingly, the menu portions "A", "B", "C", "D" and "E" marked with "$W_1$" are operated at first to input their commands into the processing device, and then the menu portion OP. END 58 marked with "$G_2$" will be operated in the Input 52 step. As for the other steps Process-1 53 to Process-3 55, the operations will be similarly carried out.

TABLE 2

| The Lighting Order of the Light Sources | | | | | | | | | | | |
|---|---|---|---|---|---|---|---|---|---|---|---|
| Processing | Menu Portions | | | | | | | | | | |
| Steps | A | B | C | D | E | F | G | H | I | J | K | L |
| Input (52) | $W_1$ | $W_1$ | $W_1$ | $W_1$ | $W_1$ | | | | | | | |
| Process-1 (53) | | | | | | $W_3$ | $W_3$ | $W_3$ | | | | |
| Process-2 (54) | | | | | | | | | $W_5$ | $W_5$ | $W_5$ | $W_5$ |
| Process-3 (55) | | | | | | | | | | | | |

| | Menu Portions | | | | | | | | | | OP. END |
|---|---|---|---|---|---|---|---|---|---|---|---|
| Processing Steps | M | N | O | P | Q | R | S | T | U | V | (58) |
| Input (52) | | | | | | | | | | | $G_2$ |
| Process-1 (53) | | | | $R_3$ | $R_3$ | | | $Y_3$ | $Y_3$ | $Y_4$ | $G_4$ |
| Process-2 (54) | | | | $R_5$ | $R_5$ | $R_5$ | | $Y_5$ | $Y_5$ | $Y_6$ | $G_6$ |
| Process-3 (55) | $W_7$ | $W_7$ | $W_7$ | | | $R_7$ | $R_7$ | | | $Y_8$ | $G_8$ |

As described hereinbefore, each of the plural processing steps in sequential data processing carried out by a computer can be easily performed in accordance with the present invention because the menu portions to be input, the serial order of the inputs, and the corresponding functions are directly indicated on the digitizer on the menu portions by means of the lighting order and colors of the light sources, these indications being given distinctively and instantaneously.

Consequently, the operator will be relieved of the various intricate steps such as selecting the menu portions necessary for each processing step, memorizing the functions thereof beforehand and/or confirming them each time. Work efficiency will therefore increase, and errors will be effectively avoided.

Moreover, with the invention it is unnecessary to instruct the operator in respect to the functions and the operational order of menu portions in each step. He needs to learn only the arrangements concerning the colors of the lighting sources. A so-called foolproof effect will thus be brought about since even an unskilled operator can execute the computer processing with surprising easiness by virtue of the simple guidance given by means of the lighting order and colors of said light sources.

It will be appreciated that the number, color and arrangement of said light sources in each abovementioned cells are not limited to those in the embodiment but can be modified according to the design of said menu portions.

In addition, the said cells may be constructed such that they are separated from one another so as to be plural independent units which can be installed onto the back side of a transparent digitizer, and at any desired position thereof. The apparatus of the invention, in this case, can be properly utilized even where the number and location of the menu portions may frequently be altered.

Figure 5:
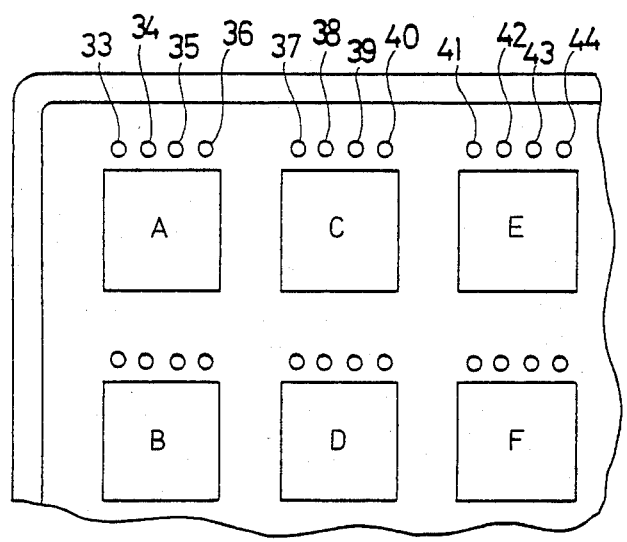
FIG. 5 illustrates a modified embodiment of the invention.

It will be noted also that the light sources of different colors can be disposed respectively adjacent each menu portion, as shown in FIG. 5, thereby giving the same effects as those in the first embodiment. The reference numerals 33, 37, 41 indicate a white light source, the numerals 34, 38, 42 indicate a red one, the numerals 35, 39, 43 indicate a yellow one, and the numerals 36, 40, 44 indicate a green one.

What is claimed is:

1. Digitizer apparatus comprising a menu element having a face divided into a plurality of blocks, each block being responsive to activation by an operator to produce a corresponding command signal for control of a data processing device having a plurality of modes of operation, a plurality of cells positioned behind the face, each cell corresponding to one of the plurality of blocks, a plurality of light sources of different colors associated with each cell, and control means for controlling of the illumination of each of the plurality of light sources so as to selectively illuminate at least one light source to indicate a command signal to be provided in the next step in a series of sequential processing steps to be carried out in a selected one of the plurality of modes of operation of the data processing device.

2. Digitizer apparatus according to claim 1 wherein the control means is arranged to illuminate a light source having a selected color in connection with a specific type of processing step.

* * * * *